United States Patent [19]

Kleiner et al.

[11] 4,052,657
[45] Oct. 4, 1977

[54] DISTRIBUTION SYSTEM FOR A. C. ELECTRICAL ENERGY DERIVED FROM D. C. ENERGY SOURCES

[75] Inventors: Charles T. Kleiner, Fullerton; Walter Hochwald, Downey, both of Calif.

[73] Assignee: Rockwell International Corporation, El Segundo, Calif.

[21] Appl. No.: 679,271

[22] Filed: Apr. 22, 1976

[51] Int. Cl.² ............................................. H02M 1/12
[52] U.S. Cl. ..................................................... 363/43
[58] Field of Search ................. 321/9, 27 MS, DIG. 1

[56] References Cited

U.S. PATENT DOCUMENTS

| | | | |
|---|---|---|---|
| 3,189,813 | 6/1965 | Frierdich | 321/27 MS |
| 3,491,282 | 1/1970 | Heinrich et al. | 321/9 R X |
| 3,523,236 | 8/1970 | Howell et al. | 321/9 R |

Primary Examiner—William M. Shoop
Attorney, Agent, or Firm—H. Fredrick Hamann; G. Donald Weber, Jr.; Gilbert H. Friedman

[57] ABSTRACT

Apparatus for providing alternating current electrical energy to a load wherein an alternating current energy source includes one or more direct current energy sources coupled to one or more inverters each having at least one switching element therein. Switching elements are controlled to provide alternating current waveforms having a relatively low harmonic content. A preferred embodiment has two alternating current sources. The two alternating current sources are coupled to the load in a manner which causes their output voltages to be summed vectorially across the load. The phase difference between the output voltages of the two sources is controlled to regulate the resultant load voltage by controlling the operation of the switching elements in the inverters.

16 Claims, 11 Drawing Figures

DISTRIBUTION SYSTEM FOR A. C. ELECTRICAL ENERGY DERIVED FROM D. C. ENERGY SOURCES

BACKGROUND OF THE INVENTION

1. Field of the Invention

The present invention relates generally to apparatus for distributing alternating current electrical energy to a load wherein the electrical energy originates in a direct current energy source. More particularly, the invention pertains to an electrical distribution system in which a switching element in an inverter is controlled to provide an alternating current waveform having a low harmonic content and wherein the same switching element may also be controlled to provide regulation of the alternating current load voltage.

2. Description of the Prior Art.

It is widely recognized that apparatus for converting electrical energy from direct current sources to low frequency alternating current and voltage for distribution to a substantial load should have several desirable characteristics. In order to minimize unnecessary heating in certain types of load elements by higher harmonic currents, it is desirable that the A. C. voltage have a waveform which is a good approximation to a pure sine wave. In order to accomodate transients and large reactive currents in the load, it is desirable that the power source have a low impedance. It is also desirable to regulate the load voltage to remain at a relatively constant amplitude. Where semiconductor elements are used for the conversion from direct to alternating current and for the regulation of the voltage, it is desirable to operate these elements at the lowest possible frequency.

In one well-know class of distribution systems, an inverter produces a square wave output which is then gated through a bidirectional switch, the switch being operated to vary the width of the bipolar pulses of the square wave to provide regulation. Considerable filtering is required in this type of system to produce a sinusoidal output. Filter components are, in general, cumbersome and expensive at power frequencies. The presence of filters also increases the source impedance.

In another well-known type of distribution system which comprises a closed-loop system tracking the waveform of a sinusoidal reference signal, a power switch is clocked to operate at a relatively high frequency in a bang-bang fashion to produce a train of pulse-width modulated bipolar power pulses. This approach reduces the filtering requirements, along with the source impedance, since the lower frequency harmonics are reduced but it requires the use of fast-response semiconductor elements.

In yet another well-known type of distribution system, a plurality of pulse gating signals are generated to control the operation of a plurality of power switches. The outputs of the plurality of power switches are added. The gating signal and corresponding power switch outputs, when added, approximate a sine wave. Regulation is achieved by means of a controller which adds pulses, deletes pulses, or shifts their time of occurence, as necessary. While this type of system can eliminate the requirement for filtering and tends to have a low source impedance, it can cause discrete discontinuities in the waveform. In addition, the controller tends to be complex.

Lastly, distribution system is which a plurality of quasi-square waves are added to produce an approximation to a sine wave are known. It has been the practice to regulate the output of such systems by adjusting the direct current input to the inverters. Such systems have a high dynamic source impedance and, therefore, a poor dynamic response.

SUMMARY OF THE INVENTION

The general purpose of this invention is to provide apparatus for a regulated power distribution system for alternating current and voltage in which the desirable characteristics for such a system, as outlined above, are enhanced. The apparatus is particularly well-suited for the conversion of direct current electrical energy generated by solar cell arrays to alternating current electrical energy for single phase and multiple phase loads. In the preferred embodiment, neither filters nor transformers are required. Therefore, all of the components of the system may be fabricated in the same semiconductor panel in which the solar cells are located by integrated circuit fabrication techniques.

In the present invention, a direct current electrical energy source is coupled to an inverter, the inverter including at least one switch element controlled in its operation by a gating signal. The gating signal operates the switch element in a manner which causes the inverter to produce alternating current electrical energy at a predetermined frequency wherein the voltage has a quasi-square waveform. A quasi-square wave has a harmonic content which is lower than that of a square wave. The gating signal is produced by a controller which determines the transition times, frequency, and absolute phase of the gating signal. In a preferred embodiment of the present invention, a plurality of such inverters are coupled together to provide a source for an alternating current voltage having a composite waveform which is the sum of the plurality of quasi-square waveforms of the voltages produced by each distinct inverter in the source. The gating signals provided to operate the switch elements in the plurality of inverters all have the same frequency and will usually be in phase with each other. However, the gating signals have differing transition times for the distinct inverters. These differing transition times cause the individual quasi-square waveforms for voltage resulting from the operation of each distinct inverter to produce, when summed, a composite waveform which has a lower harmonic content than that of a single quasi-square waveform. The greater the number of voltages having quasi-square waveforms which are summed in accordance with this invention to produce the composite waveform for the alternating current voltage source, the less is the amount of harmonic content in the composite waveform. Preferably, the number of distinct inverters used is enough to cause the composite waveform produced to approximate a sinusoid with sufficient accuracy so that no filter is necessary.

In a preferred embodiment, two distinct sources for an alternating current voltage are provided. Each distinct alternating current source includes at least one inverter operated as described above. The two distinct alternating current sources are preferably similar to each other in structure and capacity. They are coupled to each other and to the load in a manner which causes their respective output voltages to be summed vectorially across the load. A first set of gating signals is provided to operate switch elements in the inverters of the first source and a second set of gating signals is provided to operate switch elements in the inverters of the second source. While all of the gating signals in any one of the two sets of gating signals will usually be in phase with each other, as stated above, the two sets of gating signals have a variable phase relationship with respect to each other. The phase relationship between the two sets of gating signals is varied by the controller in a manner which regulates the amplitude of the voltage across the load, viz, which maintains the amplitude of the load voltage substantially constant to within specified tolerances of a predetermined amplitude.

The controller for the present invention preferably includes a memory for storing information related to the specified values for the operating parameters of the electrical energy distribution system and the specified tolerances within which these parameters must be maintained. Examples of such parameters are frequency, voltage amplitude, and peak allowable energy demand. In addition, the memory also stores control algorithms for maintaining the specified parameters within their specified tolerances. The control further includes data processing means for accepting data from sensors, the data indicating the operating state of the energy distribution system. The data processing means operates on that data using the aforementioned control algorithms to provide, through output circuitry, the gating signals which control the inverters as discussed above. Other control signals as may be appropriate may also be provided. These include, for example, signals to operate devices to disconnect the energy source from the load when energy demand exceeds rated capacity.

DESCRIPTION OF THE PREFERRED EMBODIMENTS

Figure 1:
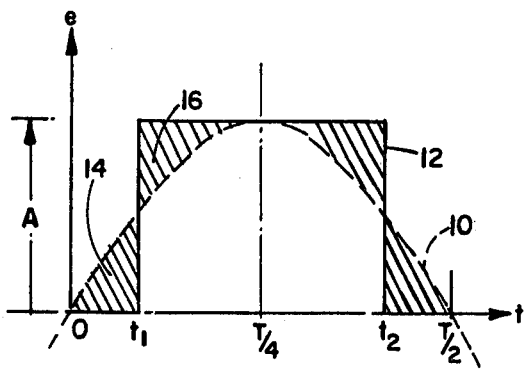
FIG. 1 illustrates the waveforms of a quasi-square wave and a sine wave approximated by the quasi-square wave.

FIG. 1 shows a pair of coordinate axes in which the abscissa is time, $t$, and the ordinate is potential difference or voltage, $e$. One half of one cycle of a sinusoidal waveform is represented by the dashed curve 10 in FIG. 1. The sinusoidal waveform 10 has an amplitude A and a period T. An A.C. voltage having a waveform which is a square wave of amplitude A and period T may be regarded as an approximation to the sinusoidal waveform 10. As is well known, an idealized square wave has two states or levels, a maximum and a minimum, both levels having the same magnitude but having opposite polarities.

In certain types of systems for generating A.C. electrical energy, it is convenient to first produce square wave A.C. voltages. This is the case, for example, in systems wherein electrical energy from a D.C. source is converted to produce A.C. electrical energy by the operation of appropriate types of switches. However, it is a common requirement in A.C. electrical energy distribution systems that the A.C. voltage delivered to a load coupled to the system have a substantially sinusoidal waveform. Where square wave voltages are produced originally but substantially sinusoidal A.C. voltages are required for the load, it is necessary to remove the harmonics from the square wave, usually by filtering. Square waves have a high harmonic content and the requirements placed upon the filtering means in systems of the type described is correspondingly great.

In an A.C. electrical distribution system such as the type mentioned above, wherein A.C. energy is produced by converting electrical energy generated in D.C. sources, a substantial decrease in the harmonic content of the A.C. energy requiring removal by filtering can be achieved by causing switch elements in the inverter means to produce A.C. voltages having waveforms which are quasi-square waves rather than square waves. For the purpose of this specification, a quasi-square waveform is one having three states or levels, a maximum level, a minimum level, and a zero level. As with the square wave, the minimum level of a quasi-square wave has the same magnitude as the maximum level but has the opposite polarity. In a quasi-square wave, the waveform is at zero level for equal finite intervals between each transition from maximum level to minimum level and between each transition from minimum level to maximum level. As with the sine wave and the square wave, the quasi-square wave has half-wave and quarter-wave symmetry.

In FIG. 1, superimposed on the sinusoidal waveform 10, there is shown one-half of one cycle of a quasi-square waveform 12 having an amplitude A and period T. The quasi-square waveform 12 is in phase with and approximates the sinusoidal waveform 10. The waveform 12 has significantly less harmonic content than a square wave of the same amplitude. The quasi-square wave 12 in FIG. 1 has a transition from zero level to maximum level of amplitude A at time $t_1$ and a transition from maximum level to zero level at time $t_2$. In the present invention, the transition time $t_1$ is controlled to cause the shaded area 14 under the sinusoidal waveform 10 in the interval from zero time to time $t_1$ to be equal to the shaded area 16 between the quasi-square wave 12 and the sine wave 10 in the interval from the time $t_1$ to the time T/4. The transition time $t_2$ is similarly controlled for the second quarter cycle. Since the quasi-square wave has half wave symmetry, the transition times during negative half cycles are similarly controlled.

Figure 2A:
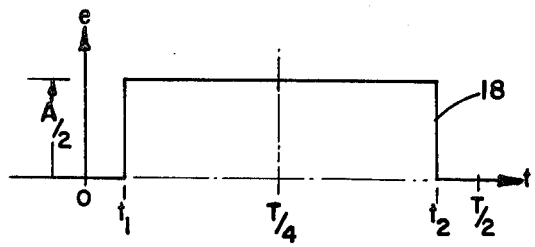
FIGS. 2A-2C illustrate the waveforms of two distinct quasi-square waves and a composite waveform resulting from their summation approximating a sine wave.
Figure 2B:
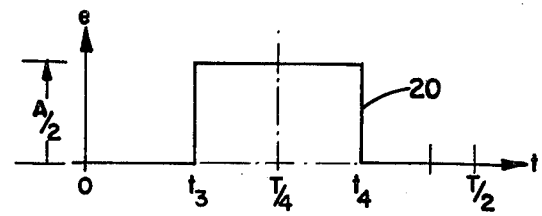
Figure 2C:
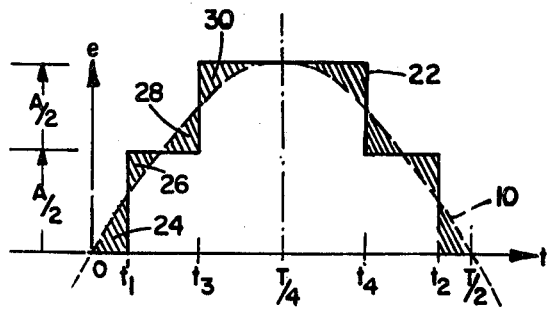

FIGS. 2A-2C illustrate the manner in which two distinct A.C. voltages having quasi-square waveforms may be combined by addition to form an A.C. voltage having a waveform which is an even closer approximation to a sinusoidal waveform than is achieved when a single quasi-square wave is used for the approximation. FIG. 2A shows one half cycle of the periodic waveform of a first A.C. voltage having a quasi-square waveform 18 of amplitude A/2 and period T. In the half cycle shown for the waveform 18 the time of transition from zero level to maximum level is $t_1$ and the time of transition from maximum level to zero level is $t_2$. FIG. 2B shows one half cycle of a second A.C. voltage having a quasi-square waveform 20, also having amplitude A/2 and period T. In the half cycle shown for the waveform 20, the time of transition from zero level to maximum level is $t_3$ and the time of transition from maximum level to zero level is $t_4$.

The A.C. voltages having quasi-square waveforms 20 and 22 shown in FIGS. 2A and 2B are summed to produce an A.C. voltage of amplitude A and period T having the composite waveform 22 of FIG. 2C. The composite waveform 22 is an approximation to the sinusoidal waveform 10 having the same amplitude and period. Waveforms 10 and 22 are shown superimposed on each other in FIG. 2C.

In the present invention, in order to cause the composite waveform 22 to have a relatively low harmonic content, the transition time $t_1$ is controlled to cause the shaded area 24 under the sinusoidal waveform 10 in the interval from time zero to the time $t_1$ to be equal to the shaded area 26 between the composite waveform 22 and the sine wave 10 in the interval from the time $t_1$ to the time at which the instantaneous level of the sine wave 10 is equal to A/2. Similarly, the transition time $t_3$ is controlled to cause the shaded area 28 between the sinusoidal waveform 10 and the composite waveform 22 in the interval from the time at which the instantaneous level of the sine wave 10 is equal to A/2 to the time $t_3$ to be equal to the shaded area 30 between the waveforms 22 and 10 in the interval from the time $t_3$ to the time T/4.

From the foregoing discussion, it is readily apparent that any desired number of distinct quasi-square waves of A.C. voltage may be combined by addition to form a composite waveform approximating a sinusoidal waveform and that the approximation can be made more precise as the number of quasi-square waves so combined is increased. Consequently, filtering requirements to produce an A.C. voltage having an acceptably low harmonic content for distribution to loads in an A.C. electrical distribution system are significantly reduced and eventually eliminated as the number of quasi-square waves so combined is increased. In accordance with the present invention, the transition times of each distinct A.C. voltage having a quasi-square waveform which is summed to produce an A.C. voltage having a composite waveform are controlled so that the time integral of the difference between the approximating composite waveform and an approximated sinusoidal waveform of the same amplitude, period, and phase is caused to be substantially zero between each two succeeding points or instants in time at which the instantaneous values of the sinusoidal waveform and the composite waveform are equal. The same rule is followed when a single quasi-square wave is intended to approximate a sine wave.

It should be noted that, although the foregoing discussion has been in terms of voltage and the summation of distinct A.C. voltages having quasi-square waveforms to produce a desired composite A.C. voltage waveform, the principles discussed apply equally well to combining distinct A.C. currents to produce a desired composite A.C. current waveform.

Figure 3:
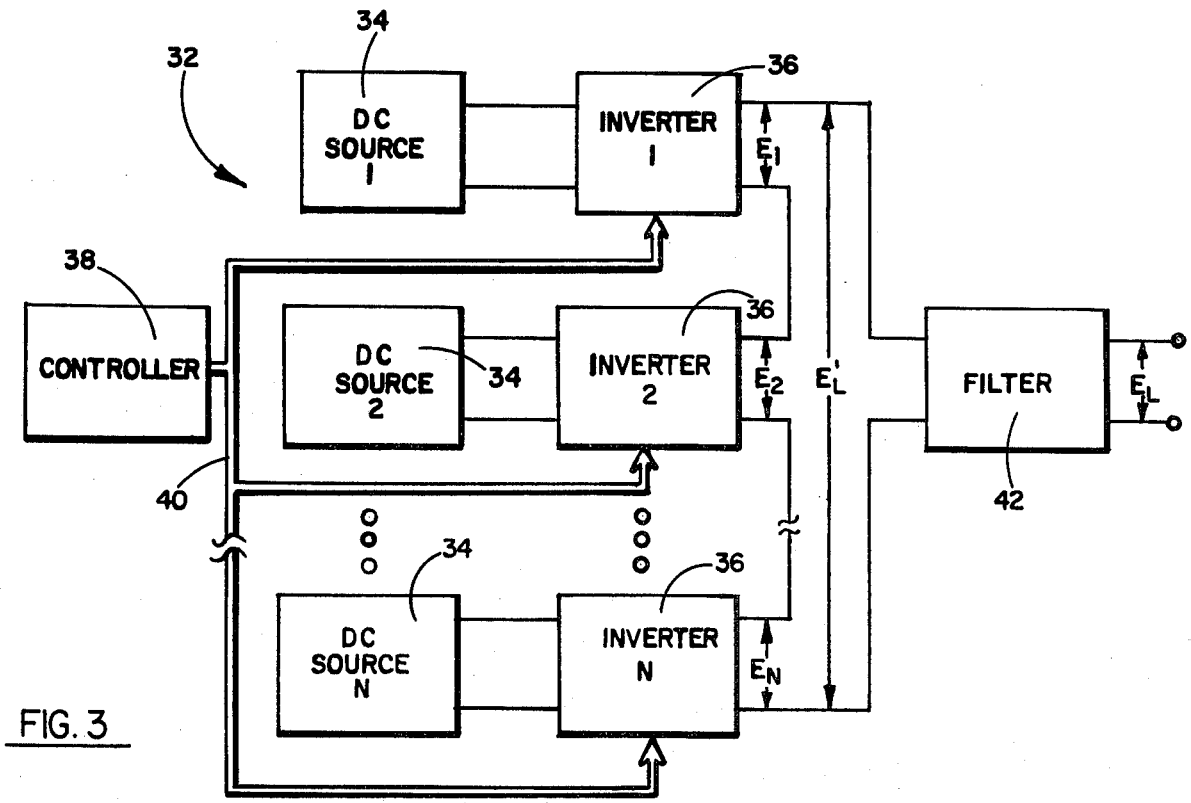
FIG. 3 shows a block diagram of an alternating current energy source in accordance with this invention.

FIG. 3 shows in general form an A.C. electrical energy source 32 suitable for use in an A.C. electrical energy distribution system. The A.C. electrical energy is derived from at least one distinct D.C. energy source. In the preferred embodiment of this invention, a plurality, N, of distinct D.C. energy sources 34 are included in the A.C. source 32. Each D.C. energy source 34 may include any suitable devices for generating D.C. electrical energy such as, for example, electrochemical energy sources, photovoltaic energy sources, fuel cells, rotating D.C. generators, and the like or any suitable combination of such energy sources. The D.C. energy sources 34 included in A.C. energy source 32 are preferably all substantially similar to each other in their structures and in their capacity for generating electrical energy.

Each distinct D.C. energy source 34 in the A.C. source 32 of FIG. 3 is coupled to a distinct inverter circuit 36 each having substantially the same structure, mode of operation and capacity. Each inverter circuit 36 includes at least one controllable switch element for converting the D.C. energy supplied thereto to A.C. electrical energy. The controllable switch elements in the several inverter circuits 36 are responsive to gating signals applied thereto to control their operation. The gating signals originate in controller 38 and are supplied to the inverters 36 by way of a distribution cable 40. The gating signals originating in the controller 38 are such as to cause each inverter 36 to produce an A.C. voltage having a quasi-square waveform as has been discussed in connection with FIGS. 1, 2A and 2B. All of the A.C. voltages so produced, designated $E_1$ through $E_N$ in FIG. 3, are caused by the gating signals to have the same predetermined frequency and to be substantially in phase with each other. The several inverters 36 are interconnected in series so that the A.C. output voltages of each of them are summed to produce an A.C. voltage $E_L'$ having a composite waveform which corresponds to the sum of the waveforms of each of the A.C. voltages $E_1$ through $E_N$ as illustrated in FIGS. 2A-2C. The transition times for the quasi-square waveforms of A.C. voltages $E_1$ through $E_N$ are controlled by the gating signals originating in the controller 38 so that the composite waveform of $E_L'$ closely approximates a sinusoidal waveform as discussed above. Where the approximation is insufficiently precise to meet the specifications for a particular A.C. energy distribution system, a filter 42 may be interposed between the series-connected inverters 36 and a load (not shown) to reduce the harmonic content of $E_L'$ further, thereby producing an A.C. load voltage $E_L$, shown as the output voltage of the filter 42 in FIG. 3.

Figure 4:
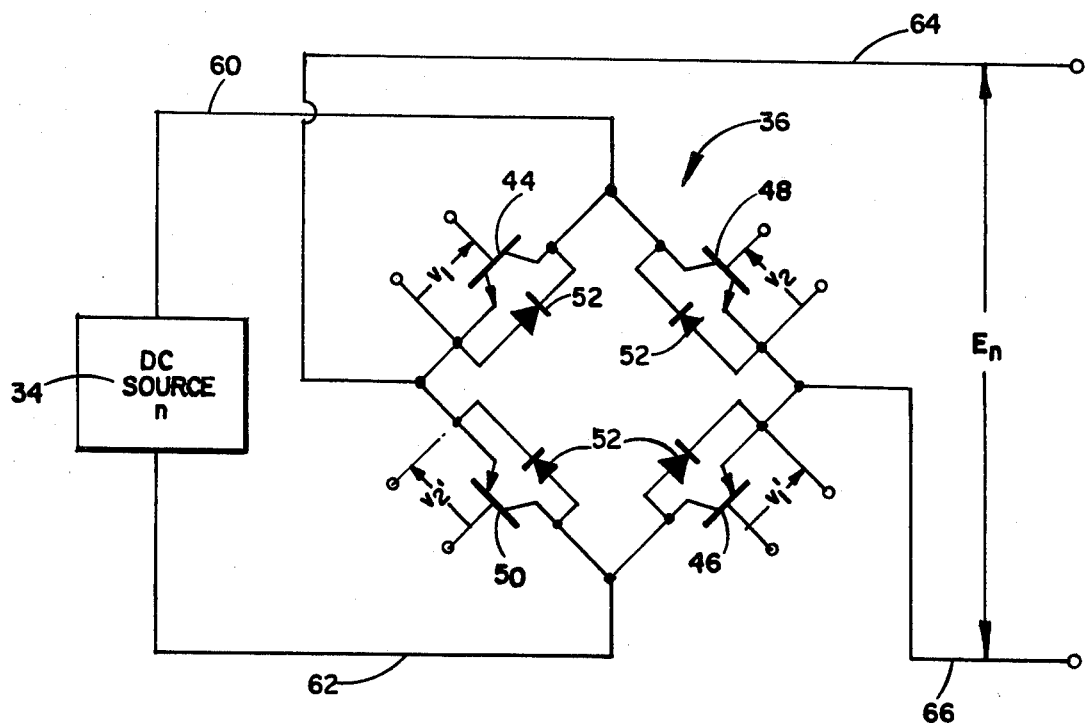
FIG. 4 shows a portion of an alternating current energy source wherein details of an inverter circuit are given.

FIG. 4 shows, in greater detail, one of the N sources for an A.C. voltage, $E_n$, having a quasi-square waveform which comprises the A.C. electrical energy source 32 of FIG. 3. The particular inverter circuit 36, shown in FIG. 4 is a bridge circuit having controllable semiconductor switch elements 44, 46, 48 and 50, one in each of the four branches of the bridge. This is but one of several possible configurations for an inverter circuit 36 and is shown here by way of example only. Each of the switch elements in the inverter 36 is connected in parallel with a commutating rectifier 52 so that a continuous path for current to and from other D.C. sources in the A.C. source 32 is provided. The commutating rectifiers 52 also provide a continuous low impedance path through the inverter circuit 36 when the load is inductive. If the D. C. source 34 is, for example, a semiconductor panel in which an array of solar cells is fabricated, the bridge circuit of inverter 36 may, for convenience, be fabricated in the same semiconductor panel by integrated circuit fabrication techniques. Switch elements 44 and 46 are switched between their open or off states and their closed or on states by gating signals $v_1$ and $v_1'$, respectively, which are synchronous with each other. Similarly, switch elements 48 and 50 are switched between their off and on states by synchronous gating signals $v_2$ and $v_2'$. When switch elements 44 and 46 are gated on and switch elements 48 and 50 are gated off, the conductors 60 and 62 from D.C. source 34 are connected to output conductors 64 and 66 respectively providing a first polarity for the A.C. output voltage $E_n$. When the reverse is true, conductors 60 and 62 are connected to output leads 66 and 64, respectively providing a second opposite polarity for the A.C. output voltage $E_n$. Since $E_n$ has a quasi-square waveform, there are substantially equal intervals of time between the two opposite polarity conditions described above when $E_n$ is at zero level. To produce this result, D.C. source 34 could be disconnected from the output terminals 64 and 66 by gating all of the switch elements in inverter 36 to their off state simultaneously. However, this approach would cause an inverter 36 to have a high internal impedance during such intervals. Energy sources having a low internal impedance are generally preferred. Therefore, in embodiments of this invention where D.C. source 34 is a solar cell array, switch elements 44, 46, 48 and 50 are all gated to their on state during intervals when the quasi-square waveform $E_n$ is required to be at zero level. This gives the lowest possible internal impedance for an inverter 36. However, it also creates a short circuit across D.C. source 34. Solar cells can ordinarily withstand short-circuit currents since they resemble constant current sources at any given level of insolation. Where the D.C. source 34 is a type which may be damaged by short-circuit currents, it may be disconnected from the inverter 36 during short-circuit intervals by, for example, a controllable switch element (not shown) in conductor 60 and 62 operating in response to an additional gating signal from the controller 38 of FIG. 3. Another approach, which avoids drawing short-circuit currents from a source 34 but which causes an inverter 36 to have a somewhat higher internal impedance, is to gate either switch elements 44 and 48 or switch elements 46 and 50 to their on state whenever $E_n$ is to be at zero level.

Figure 5A:
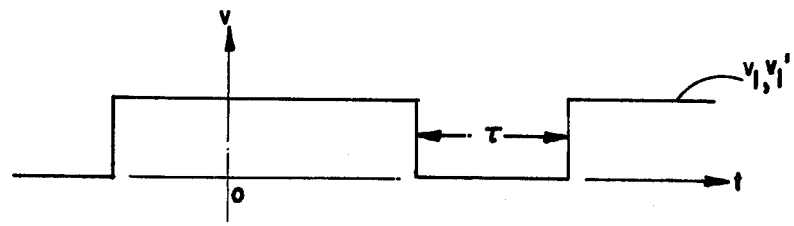
FIGS. 5A-5C illustrate the waveforms of gating signals for controlling the operation of the inverter circuit of FIG. 4 and the resulting quasi-square wave output of the inverter circuit.
Figure 5B:
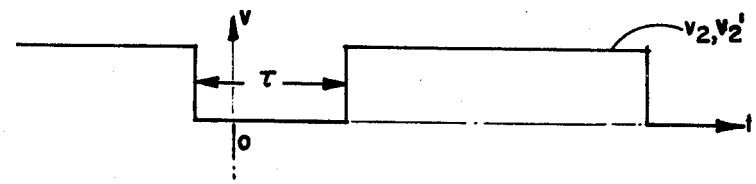
Figure 5C:
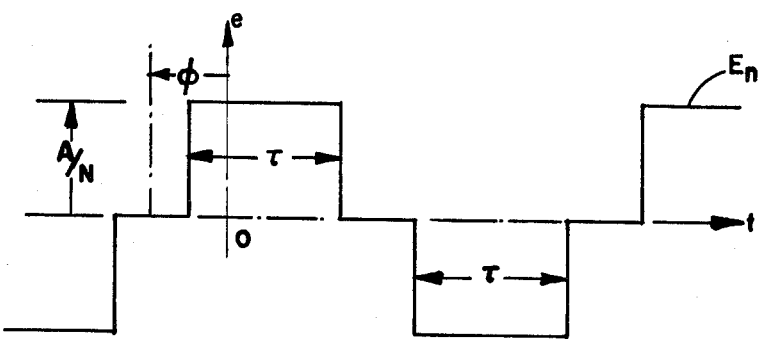

Waveforms for gating signals to control the operation of switch elements 44, 46, 48 and 60 are shown in FIGS. 5A and 5B while the resulting quasi-square waveform for A.C. voltage $E_n$ is shown in FIG. 5C. In FIG. 5A, the waveform for synchronized gating signals $v_1$ and $v_1'$ is shown. Except during periodic time intervals of duration $\tau$, signals $v_1$ and $v_1'$ operate to keep switch elements 44 and 46 of FIG. 4 in their on states. In FIG. 5B, the waveform for synchronized gating signals $v_2$ and $v_2'$ is shown. Except during periodic time intervals of duration $\tau$, signals $v_2$ and $v_2'$ operate to keep switch elements 48 and 50 of FIG. 4 in their on states. The time intervals of duration $\tau$ for $v_1$ and $v_1'$ are 180 degrees out of phase with the time intervals of duration $\tau$ for $v_2$ and $v_2'$. The time intervals $\tau$ are always less than one-half of a period for causing quasi-square wave A.C. voltages to be produced. FIG. 5C shows the resulting quasi-square waveform for A.C. voltage $E_n$ produced by the inverter 36 of FIG. 4 as controlled by the gating signals of FIGS. 5A and 5B. $E_n$ is shown as having an amplitude of A/N where A is the amplitude of the composite waveform of the A.C. voltage $E_L'$ produced by the A.C. source 32 of FIG. 3. In addition, $E_n$ is shown as having a phase lead $\phi$ with respect to the time origin. In the preferred embodiments of the subject invention, the controller 38 of FIG. 3, includes means for varying and controlling the absolute phase of all of the synchronized gating signals supplied to the inverters 36 of FIG. 3 so as to enable the absolute phase of the composite A.C. voltage $E_L'$ output by A.C. source 32 to be adjusted to a desired absolute phase.

Figures 6, 7:
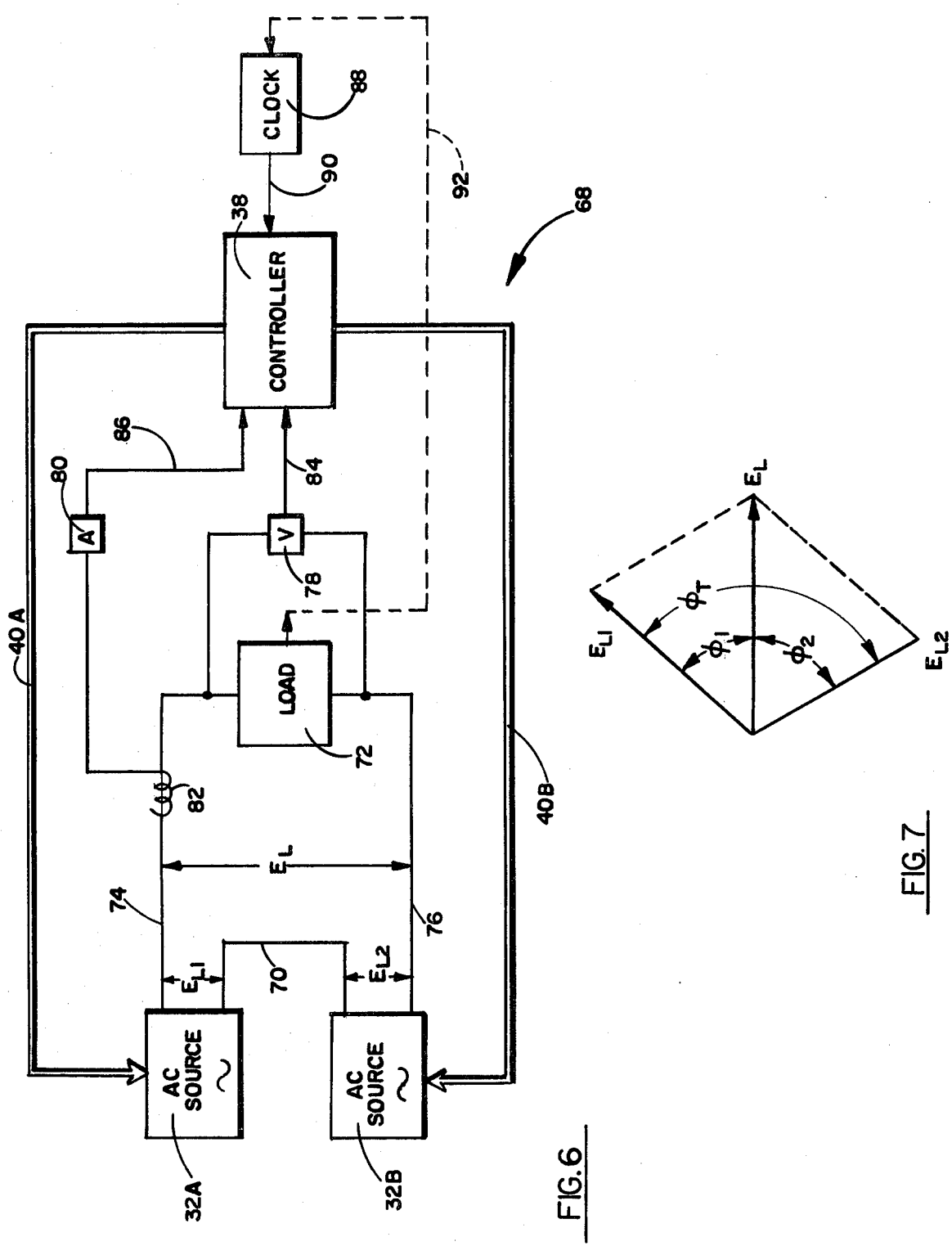
FIG. 6 shows a block diagram for an electrical energy distribution system in accordance with this invention wherein two distinct alternating current energy sources are provided.
FIG. 7 is a vector diagram illustrating the phase relationship of the outputs of the two alternating current energy sources of FIG. 6 and the manner in which the outputs are vectorially added to produce a resultant load voltage.

Referring now to FIG. 6, there is shown an electrical distribution system 68 for A.C. electrical energy which embodies the features of the invention discussed heretofore and provides additional features desired in such a system. The system 68 includes two distinct sources for A.C. electrical energy, viz, sources 32A and 32B. In a preferred embodiment each of these sources is substantially similar in structure and mode of operation to the A.C. electrical energy source 32 shown in FIG. 3. A.C. energy sources 32A and 32B are connected in series by conductor 70. The A.C. output voltage $E_{L1}$ of source 32A is summed vectorially with the A.C. output voltage $E_{L2}$ of source 32B to produce an A.C. voltage $E_L$ coupled to a load 72 by conductor 74 from source 32A and conductor 76 from source 32B. The inverters in A.C. source 32A receive a first set of phase-variable synchronized gating signals from the controller 38 through cable 40A while the inverters in A.C. source 32B receive a second set of phase-variable synchronized gating signals from the controller 38 through cable 40B. The absolute phase of the A.C. load voltage $E_L$ may be controlled, if desired, by establishing a particular absolute phase reference for all gating signals. In addition, the amplitude of the load voltage $E_L$ may be regulated to within a specified tolerance of a specified amplitude by varying the phase difference of $E_{L1}$ with respect to $E_{L2}$.

FIG. 7 is a diagram representing the vector summation of the fundamental components of two distinct A.C. voltages $E_{L1}$ and $E_{L2}$ which yields the resultant load voltage $E_L$. The phase difference between $E_{L1}$ and $E_{L2}$ is represented in FIG. 7 by the angle $\phi_T$. In an electrical distribution system operating in accordance with the present invention, $E_L$ is regulated to have a substantially constant amplitude within specified tolerances of a specified amplitude despite variations which may occur in the amplitude of $E_{L1}$, $E_{L2}$, or both of them, by varying $\phi_T$. The phase difference, $\phi_T$, between $E_{L1}$ and $E_{L2}$ is established and controlled by controlling the phase difference between the two sets of synchronized gating signals transmitted from the controller 38 of FIG. 6 by way of cables 40A and 40B to the controllable switch elements in the inverters included in A.C. sources 32A and 32B. Under circumstances where $E_{L1}$ or $E_{L2}$ or both of them are increasing in amplitude, thereby tending to increase the amplitude of $E_L$, the controller 38 operates to increase the phase difference, $\phi_T$, between $E_{L1}$ and $E_{L2}$ to prevent the amplitude of $E_L$ from increasing. Conversely, where $E_{L1}$ or $E_{L2}$ or both of them are decreasing in amplitude, thereby tending to decrease the amplitude of $E_L$, the controller 38 operates to decrease the phase difference, $\phi_T$, between $E_{L1}$ and $E_{L2}$ to prevent the amplitude of $E_L$ from decreasing.

Returning now to FIG. 6, there is shown a voltage sensing instrument 78 connected across the load 72 and a current sensing instrument 80 for measuring the load current in conductor 74 by conventional current sensing means represented by the coil 82 proximate conductor 74. The instruments 78 and 80 provide load voltage and current data to the controller 38 through input means thereto represented by the conductors 84 and 86, respectively. The data is sampled at a rate determined by a clock 88 which provides a timing signal to the controller 38 by input means thereto represented by conductor 90. The timing signal preferably has a known repetition rate which is approximately two orders of magnitude greater than the desired frequency for the A.C. energy distributed by the system 68. The timing signal repetition rate controls the frequency of the gating signals supplied to the A.C. sources 32A and 32B and therefore controls the frequency of the A.C. electrical energy. Similarly, the absolute phase of the timing signal determines the absolute phase of the gating signals. Where the load 72 includes other energy sources, the clock 88 and its timing signal will be slaved to the frequency and absolute phase established by all such energy sources as indicated by the connection between the clock and the load 78 represented by dashed line 92.

As indicated previously, the controller 38 may include memory means for storing information on desired operating parameters for the system 68 such as frequency, required load voltage amplitude, maximum permissible load current as well as algorithms for operating on data input from sensors to determine control action. The algorithms are used in data processing means in the controller 38 where sensed data such as the data from voltage sensor 78 and current sensor 80 are used with the algorithms to produce, through output means, control signals such as the aforementioned gating signals.

It should be understood, of course, that the foregoing disclosure relates only to preferred embodiments of the invention and that numerous modifications may be made therein without departing from the spirit and the scope of the invention as set forth in the appended claims.

What is claimed is:

1. Apparatus for distributing A.C. electrical energy to a load comprising:
   inverter means responsive to gating signals for producing A.C. electrical energy having a waveform substantially that of a quasi-square wave; and
   controller means for providing said gating signals to said inverter means to cause said quasi-square wave to approximate a sine wave in phase with and having the same amplitude as said quasi-square wave in that the time integral of the difference between said quasi-square wave and said sine wave is caused to be substantially zero in each time interval between successive instants in time when said sine wave and said quasi-square wave have the same value.

2. The apparatus recited in claim 1 comprising a solar cell source of D.C. electrical energy coupled to said inverter means.

3. The apparatus recited in claim 2 wherein said gating signals causes all switching elements in said inverter means to be in their closed state when said quasi-square wave is at zero level.

4. The apparatus recited in claim 1 wherein said inverter means includes a bridge network connected across a source of D.C. electrical energy;
   said bridge network responsive to said gating signals to selectively connect said source of D.C. electrical energy to said load.

5. The apparatus recited in claim 4 including filter means connected between said inverter means and said load in order to reduce the harmonic content of the signals supplied to said load.

6. Apparatus for distributing A.C. electrical energy to a load comprising:
   a plurality of inverter means responsive to gating signals for producing A.C. electrical energy having quasi-square waveforms;
   means for adding together the A.C. electrical energy from said plurality of inverter means to produce A.C. electrical energy having a composite waveform; and
   controller means for providing said gating signals to said plurality of inverter means to cause said composite waveform to approximate a sine wave in phase with and having the same amplitude as said composite waveform in that the time integral of the difference between said composite waveform and said sine wave is caused to be substantially zero in each time interval between successive instants in time when said sine wave and said composite waveform have the same value.

7. The apparatus recited in claim 6 comprising a plurality of isolated D.C. electrical energy sources substantially similar to each other and each conductively coupled to a distinct one of said inverter means.

8. The apparatus recited in claim 7 wherein said plurality of inverter means produce quasi-square waveforms of which the amplitudes are substantially equal to each other.

9. The apparatus recited in claim 7 wherein said means for adding is conductive coupline means interconnecting said plurality of inverter means.

10. The apparatus recited in claim 7 wherein said D.C. electrical energy sources are solar cell sources.

11. The apparatus recited in claim 10 wherein said gating signals cause all switching elements in each of said plurality of inverter means to be in their closed state when the corresponding quasi-square waveforms are at zero level.

12. The apparatus recited in claim 6 wherein said gating signals cause said quasi-square waveforms to be substantially in phase with each other.

13. Apparatus for distributing A.C. electrical energy to a load comprising:
    a plurality of inverter means substantially similar to each other and each responsive to gating signals for producing A.C. electrical energy having a quasi-square waveform;
    a plurality of isolated D.C. electrical energy sources substantially similar to each other and each conductively coupled to a distinct one of said plurality of inverter means whereby the amplitudes of said quasi-square waveforms are substantially equal to each other;
    conductive coupling means for summing the A.C. electrical energy from said plurality of inverter means to produce A.C. electrical energy having a composite waveform; and
    controller means for providing said gating signals to said plurality of inverter means to cause said quasi-square waveforms to be substantially in phase with each other and to cause said composite waveform to approximate a sine wave in phase with and having the same amplitude as said composite waveform in that the time integral of the difference between said composite waveform and said sine wave is caused to be substantially zero in each time interval between successive instants in time when said sine wave and said composite waveform have the same value.

14. The apparatus recited in claim 13 wherein said isolated D.C. electrical energy sources are each solar cell sources.

15. The apparatus recited in claim 14 wherein said gating signals cause all switching elements in each of said inverter means to be in their closed state when the corresponding quasi-square waveforms are at zero level.

16. In an apparatus for inverting unindirectional potential into alternating potential of a predetermined frequency, a plurality of in-phase voltage generators, each said generator having a quasi-square shaped output voltage wave of said predetermined frequency, conductive coupling means combining the output voltage waves of said generators to produce a resulting voltage wave of composite configuration, the amplitudes of said output voltage waves being substantially equal to each other, and controller means for adjusting switching times of switching means in said generators so that said resulting wave generally follows the configuration of a sine wave and contains a lesser quantity of harmonics than are contained in said output voltage waves of said generators.

* * * * *